United States Patent
Wurmbauer

(10) Patent No.: US 6,365,121 B1
(45) Date of Patent: Apr. 2, 2002

(54) METHOD FOR PRODUCING HYPERAZEOTROPIC HYDROCHLORIC ACID FROM METAL CHLORIDE SOLUTIONS

(75) Inventor: Dieter Wurmbauer, Mödling (AT)

(73) Assignee: S.A.D. EDV-Systemanalyse und-Systemdesign Gesellschaft m.b.H., Vienna (AU)

(*) Notice: Subject to any disclaimer, the term of this patent is extended or adjusted under 35 U.S.C. 154(b) by 0 days.

(21) Appl. No.: 09/367,862
(22) PCT Filed: Mar. 5, 1998
(86) PCT No.: PCT/AT98/00052
  § 371 Date: Nov. 5, 1999
  § 102(e) Date: Nov. 5, 1999
(87) PCT Pub. No.: WO98/39249
  PCT Pub. Date: Sep. 11, 1998

(30) Foreign Application Priority Data
  Mar. 5, 1997 (AT) .................................. 379/97

(51) Int. Cl.[7] .............................. C01B 7/03; C01B 7/07
(52) U.S. Cl. ................ 423/488; 423/150.3; 423/DIG. 1
(58) Field of Search .................... 423/488, 481, 423/DIG. 1, 138, 150.1, 150.3

(56) References Cited

U.S. PATENT DOCUMENTS 3,529,931 A * 9/1970 Mocklebust .............. 423/481
3,578,401 A * 5/1971 Ueberle et al. ............ 423/488
3,816,599 A    6/1974 Kafes ....................... 423/488
3,852,430 A * 12/1974 Lienau et al. .............. 423/488
4,216,196 A   8/1980 Hohmann .................. 423/481
5,846,510 A * 12/1998 Hollitt ....................... 423/488

FOREIGN PATENT DOCUMENTS

DE    220583    4/1985
DE    238 603   8/1986
DE    238 604   8/1986
JP    57-170804 10/1982

OTHER PUBLICATIONS

Abstract (English) for DD 220,583, Apr. 1985.*

* cited by examiner

Primary Examiner—Ngoc-Yen Nguyen
(74) Attorney, Agent, or Firm—Jacobson Holman, PLLC

(57) ABSTRACT

The invention relates to a process for the preparation of superazeotropic hydrochloric acid from metal chloride solutions, e.g. spent pickling solutions. The process is characterized in that the metal chloride solutions are thermally decomposed with the formation of a hydrochloric gas, that the hydrochloric gas is processed in a manner known per se into a superazeotropic mixture of hydrogen chloride and water, the superazeotropic gas mixture being condensed to yield a superazeotropic hydrochloric acid. The invention further relates to a process for ore and/or metal processing employing superazeotropic hydrochloric acid prepared according to the invention.

7 Claims, 1 Drawing Sheet

METHOD FOR PRODUCING HYPERAZEOTROPIC HYDROCHLORIC ACID FROM METAL CHLORIDE SOLUTIONS

FIELD OF THE INVENTION

The present invention relates to a process for the preparation of superazeotropic hydrochloric acid from metal chloride solutions as well as to a method for processing ores and/or metals utilizing superazeotropic hydrochloric acid prepared according to the invention.

The term "superazeotropic" in this context refers to a mixture of water and hydrogen chloride, the content of hydrogen chloride of which is higher than at the azeotropic point of the system water/hydrogen chloride under normal pressure. The azeotropic point of the system under normal pressure is at approximately 20% by weight HCl.

BACKGROUND

Regeneration of hydrochloric acid from spent solutions containing metal chloride resulting from ore and/or metal processing, e.g. solutions from leaching of ores or spent pickling acids, is known in many ways from the prior art.

In particular, the regeneration of hydrochloric acid by thermal decomposition of the solutions containing metal chloride is known, e.g. by pyrohydrolytic treatment wherein the hydrochloric acid is attained in a gaseous state in the exhaust vapors and wherein the corresponding metal oxide may be recovered as a further product.

The hydrochloric gases so recovered are mostly absorbed in water, thereby obtaining hydrochloric acid. A characteristic of this prior art process is the fact that the hydrochloric acid recovered is mostly sub-azeotropic, i.e. that the proportion of hydrogen chloride is below the azeotropic point of the system water/hydrogen chloride under normal pressure.

The reason for this is that during the adiabatic adsorption of the hydrochloric acid from hydrochloric gases the azeotropic point cannot be exceeded due to the chloride content of the starting solution.

Typical proportions of HCl in the hydrochloric acid obtained in processes according to the state of the art are e.g. in the region of 18% to 20% by weight, if the chloride content of the starting solution is about 200 g/l.

Only in exceptional cases where the chloride concentration in the solution to be regenerated is so high that a superazeotropic mixture is present already after the thermal decomposition in the hydrochloric gases, may a hydrochloric acid, the content of HCl of which is above the azeotropic point, be recovered by condensation alone.

In the event of a chloride content in the starting solution of 300 g/l a hydrochloric acid having approx. 26% to 27% by weight may be recovered by condensation alone from the roasting gas of a pyrohydrolytic treatment.

An increased need has, however, come about recently to prepare superazeotropic hydrochloric acid from solutions containing metal chloride which, as in the first case mentioned above are so composed that by a mere absorption of the hydrochloric gas only a sub-azeotropic mixture is obtained.

A need exists, however, even for the second case mentioned above where superazeotropic mixtures are already obtained per se, to obtain a more highly concentrated hydrochloric acid.

Concentrated hydrochloric acid having a HCl-content of, for example, 30% by weight or more may be employed for a greater variety of purposes than a more diluted hydrochloric acid. A concentration of hydrochloric acid having a HCl content of 26% to 27% by weight is, however, not possible by mere evaporation of excess water.

Ways and means are described in the literature as to how, from a diluted hydrochloric acid, the HCl-concentration can be moved above the azeotropic point of the system HCl/$H_2O$ by shifting the $H_2O$ partial pressure. In this context one may avail oneself e.g. of an entrainer which binds water and thereby shifts the ratio HCl:$H_2O$. It is further known to obtain superazeotropic hydrochloric acid by employing different pressures.

A process to this effect is disclosed in Ullmann's *Enzyklopädie der Technischen Chemie* (Encyclopaedia of Technical Chemistry), 3rd edition, 1964, volume XV, page 79. In this case a highly concentrated hydrochloric gas is discharged in a first tower at a pressure above atmospheric. The bottom product (diluted hydrochloric acid) is treated in a second tower at reduced pressure in which process water is evaporated off and diluted hydrochloric acid is obtained as the bottom product with the azeotropic composition typical of the reduced pressure in the second tower. This diluted hydrochloric acid can now be reintroduced to the first tower.

In order to move from the sub-azeotropic hydrochloric acid obtained by means of the known methods mentioned above or from the relatively low concentrations of superazeotropic hydrochloric acid towards concentrated superazeotropic hydrochloric acid, the prior art has up to date proposed to upgrade the hydrochloric acid obtained by the condensation or absorption of the entire hydrochloric gases in a separate installation.

However, this separate upgrading proves to be cost-intensive so that, instead of upgrading the regenerated hydrochloric acid one opts frequently for discarding the acid and for purchasing fresh hydrochloric acid for the required purposes. In many instances an 18% regenerated hydrochloric acid is thus not used any further but is neutralized which, in turn, may cause environmental problems due to the metals possibly still contained in traces in the hydrochloric acid, such as e.g. chromium or nickel.

U.S. Pat. No. 4,216,196 discloses a process in which from the total volume of the hydrochloric acid condensed from the hydrochloric gases a partial stream is upgraded to highly-concentrated HCl-gas by means of the above described entrainer method and in which this gas is reunited with the main stream of the condensate. A solution of that metal chloride which is also fed to the thermal decomposition is employed as an entrainer.

SUMMARY OF THE INVENTION

It is the object of the present invention to obtain superazeotropic hydrochloric acid from the regeneration of solutions containing metal chloride by means of a cost effective process.

This object is attained according to the invention in that the metal chloride solutions are thermally decomposed to form a hydrochloric gas, in that the hydrochloric gas is processed into a superazeotropic gas mixture of hydrogen chloride and water in a manner known per se, the superazeotropic gas mixture is condensed to yield a superazeotropic hydrochloric acid.

For the purposes of the present invention the term "processing into a superazeotropic gas mixture" in this context either means the upgrading of a hydrogen chloride water mixture having a sub-azeotropic composition into a superazeotropic mixture or the further upgrading of an already superazeotropic mixture. By "superazeotropic gas mixture" it is understood that the hydrogen chloride concentration in the gas mixture is so high that hydrochloric acid having the desired superazeotropic composition comes about after a condensation of the mixture.

The method according to the invention differs from the prior art methods in that the hydrochloric gases obtained by the thermal decomposition of the metal chlorides are upgraded to a superazeotropic gas mixture prior to their condensation so that, contrary to the prior art, it is not necessary to condense or absorb in water the entire hydrochloric gas and the hydrochloric acid obtained does not subsequently have to be treated or upgraded to a superazeotropic hydrochloric acid.

This offers the advantage that expensive upgrading plants may be kept smaller than in the case of processes according to the prior art. It is also found that the energy expenditure can be kept lower with the process according to the invention than in the case of prior art processes.

By performing the process according to the invention, the problems of the prior art are avoided in an astonishingly simple manner, enabling the person skilled in the art to prepare in a favorable manner even higher concentrations of superazeotropic hydrochloric acid from solutions containing metal chloride.

The process according to the invention is preferably so designed that the metal chloride solution is thermally decomposed in a spray-roasting-reactor or in a fluidized bed reactor. Processes of this type, e.g. the pyrohydrolytic decomposition of the solution containing metal chloride into the corresponding metal oxide and into hydrochloric gases are known per se from numerous prior art documents.

In an advantageous manner a partial stream of the hydrochloric gas is condensed or absorbed, processed in a manner known per se into a superazeotropic gas mixture and the superazeotropic gas mixture obtained is recombined with the main stream, the volume of the partial stream and/or the concentration of the resulting superazeotropic gas mixture being so selected that following the recombination of the resulting superazeotropic gas mixture with the main stream the resulting gas mixture possesses the desired superazeotropic composition.

A defined volume of hydrochloric gas is therefore separated from the main stream, e.g. by partial condensation, the said partial stream being processed into a superazeotropic gas mixture and water vapor by means of processes known from the prior art. The resulting superazeotropic gas mixture is united with the main stream of the hydrochloric gas. By the appropriate selection of the volume of the partial stream, the concentration of hydrogen chloride, respectively, to which the partial stream is upgraded, the desired concentration of the resulting gas mixture obtained by the recombination of the partial stream with the main stream may be set.

This, in particular, offers the advantage that only the water content withdrawn from the main stream, needs to be evaporated a second time for which reason, according to this preferred embodiment, the energy expenditure may be kept even more substantially lower.

The hydrochloric gas or the phial stream respectively of the hydrochloric gas is dewatered preferably by employing different pressures e.g. as described further above.

Particularly when using the process with different pressures ("pressure method") the preferred embodiment, wherein only a partial stream of the hydrochloric gases is processed, is particularly suitable.

That is to say, the pressure method proves to be more advantageous with regard to energy when carried out on a partial stream than the alternatively possible entrainer method. Furthermore, the pressure method offers the advantage that no foreign substances acting as entrainers are introduced into the process. It is moreover not necessary, contrary to the case of the entrainer method, to free the auxiliary substance (the entrainer) from HCl impurities. A further advantage of the application of the pressure method, as opposed to the entrainer method resides in that it is not necessary to purchase additional substances as entrainers. If, on the other hand, as e.g. in U.S. Pat. No. 4,216,916 , that metal chloride solution is used as an entrainer which is also thermally decomposed, the efficiency of the process depends considerably on the type of the available metal chloride solutions (e.g. chlorides of the metals Al, Fe, Cr, Ni, Mn, Co). This drawback also falls away if the pressure method is applied.

If the known entrainer method is utilized for upgrading hydrochloric gas, or the partial stream, suitable entrainers are e.g. concentrated sulphuric acid or a concentrated metal chloride solution. The metal chloride solution may be branched off that metal chloride solution which is thermally decomposed.

For the separation of the partial stream the hydrochloric gas may be absorbed in water in known manner.

Preferably, the hydrochloric acid obtained according to the invention comprises a hydrogen chloride content of more than 27% by weight, preferably 30% to 36% by weight, particularly preferably 32% by weight.

The object of the present invention is further attained by a process for ore and/or metal processing, e.g. for pickling of steels, in particular special steels, and/or for ore leaching by means of hydrochloric solutions, which is characterized in that the metal chloride solutions are thermally decomposed with the formation of a hydrochloric gas, that the hydrochloric gas is condensed of, respectively, absorbed in water, that a partial stream of the hydrochloric gas or, as the case may be , the hydrochloric acid obtained from the hydrochloric gas by condensation or absorption is split into hydrochloric acid gas and water or diluted hydrochloric acid respectively, by applying different pressures and the resulting hydrochloric acid gas is recombined with the main stream of the gas or, respectively, with the hydrochloric acid obtained from the hydrochloric gas, the volume of the partial volume being so selected that the resulting mixture shows the desired superazeotropic composition when recombining the hydrochloric acid gas with the main stream.

As already mentioned above, the procedure of upgrading a partial stream taken either from the hydrochloric gases or, in the event of the hydrochloric gases having been condensed or absorbed in water already, from the hydrochloric acid obtained thereby, permits an energetically particularly advantageous possibility for the preparation of superazeotropic hydrochloric acid by way of the described pressure method.

In a particularly efficient manner this process is so designed that as a partial stream, a partial stream from the hydrochloric acid obtained from the hydrochloric gases by absorption or condensation, is used for which purpose the treatment of the partial stream of the resulting hydrochloric acid is performed directly after the absorption or condensation of the hydrochloric gases.

For the purposes of the present invention the term "directly" means in this context that the processing of the hydrochloric acid obtained from the hydrochloric gases is performed in a plant which is not separate from the regeneration plant. The processing of the hydrochloric acid according to this advantageous embodiment rather forms part of the process of thermal decomposition of the metal chloride solution and the condensation or, respectively, absorption of the hydrochloric gases so that e.g. energy flows or water/water vapor from the stages of this process may be summoned also for the processing of the partial stream.

A particularly preferred embodiment of the process according to the invention resides in employing the hydrochloric acid obtained according to the invention as a starting solution in one of those processes where solutions come about containing metal chloride from which, in turn the hydrochloric acid is regenerated. A cycle can thus be closed and the demand for fresh hydrochloric acid substantially lowered.

For the operator of an ore and/or metal processing plant, such as e.g. a pickling plant, the attractive possibility is offered to not only regenerate—as hitherto known—hydrochloric acid from spent pickling liquors but to also obtain a more highly concentrated product by processing according to the invention the regenerated hydrochloric acid, which product may be reused either at the onset of the pickling process, but also for other purposes in the context of ore processing, e.g. leaching.

The steps of ore and/or metal processing, e.g. a pickling installation and/or a leaching installation, the recovery of hydrochloric gases from spent liquors of the ore and/or metal processing, the preparation of superazeotropic hydrochloric acid from the obtained hydrochloric gases according to the process of the invention and the condensation or adsorption of the resulting hydrochloric gas mixtures may thus be provided in a single plant.

Such a plant enables the ore and/or metal processor to cover the needs of the own enterprise for concentrated hydrochloric acid at least in part, but also to open up a further source of income by means of the superazeotropic hydrochloric acid obtained according to the invention and usable for a multitude of purposes.

The invention is further elucidated in what follows by way of the figures and working examples.

DETAILS

Figure 1:
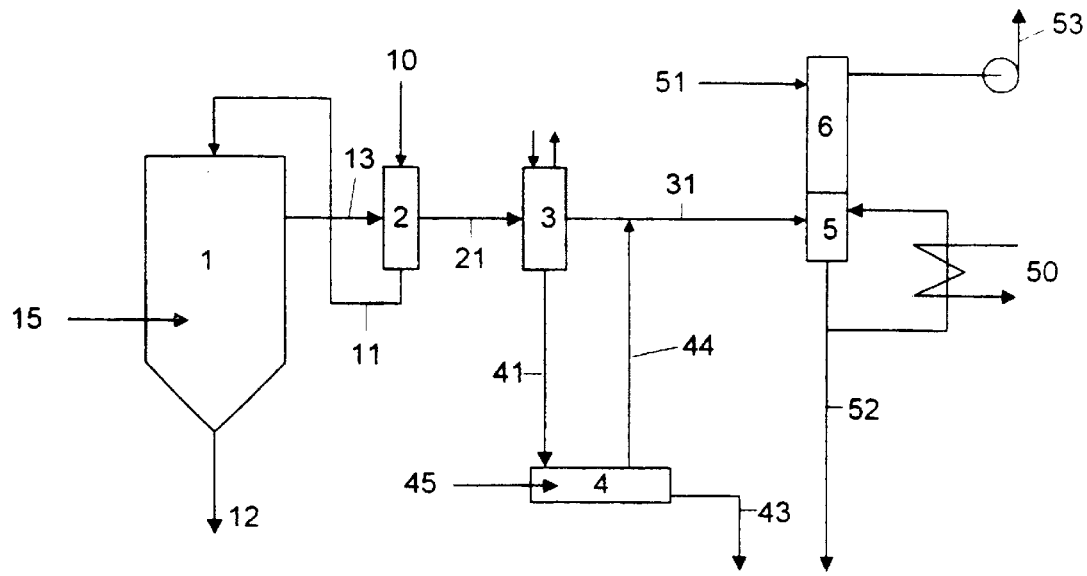
FIG. 1 schematically shows a preferred embodiment of the process according to the invention.
Figure 2:
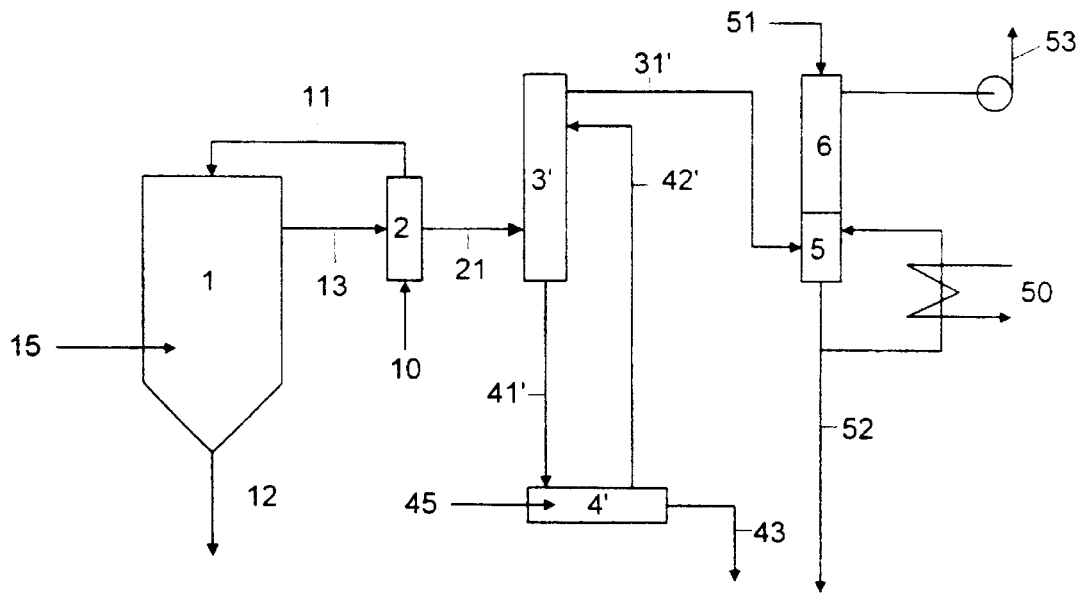
FIG. 2 schematically shows another preferred embodiment of the process according to the invention.

In this regard the reference numerals denote the following:

1 an apparatus for thermal decomposition of metal chloride solutions, e.g. a spray roasting reactor 2 an apparatus for pre-concentrating metal chloride solutions, e.g. a recuperator or a Venturi scrubber 3 an apparatus for separating a partial stream from hydrochloric gases 4 an apparatus for processing the separated partial stream into a superazeotropic gas mixture 5 an apparatus for the condensation of hydrochloric gas 6 an apparatus for purifying the waste gas In FIG. 2 the reference numerals which are identical to those in FIG. 1 refer to the same apparatus.

Furthermore, in FIG. 2

3' denotes an apparatus (e.g. a packed column) for upgrading the hydrochloric gas by means of an entrainer for water 4' denotes an apparatus for separating water from the water-loaded entrainer (e.g. a vacuum evaporation plant)

The procedure according to FIG. 1 is described as follows:

An aqueous metal chloride solution 10 is upgraded with roasting gases 13 from apparatus 1 in apparatus 2, preferably designed as a recuperator or Venturi scrubber,. The upgraded metal chloride solution 11 is introduced into apparatus 1, preferably being a spray roasting reactor. 15 denotes the energy supply to apparatus 1.

The oxides 12 recovered by the thermal decomposition, are withdrawn at the bottom of apparatus 1.

The hydrochloric gases 21 exiting from apparatus 2 are condensed in part. The absorbed partial stream 41 is conveyed to apparatus 4 and, by supplying energy 45, is upgraded in a first tower at an increased pressure to a highly concentrated HCl-gas 44, as described above, In a second tower of the apparatus 4, water is evaporated off from the remaining diluted hydrochloric acid at reduced pressure. The separate water vapor 43 is withdrawn with the waste gas 53 of the hydrochloric gas. The hydrochloric acid upgraded in the second tower is reintroduced to the first tower.

The stream of highly concentrated HCl-gas 44 is recombined with the main stream of the hydrochloric gases 31 and is condensed in the apparatus 5 by cooling 50 to liquid superazeotropic hydrochloric acid 52. The remaining inert gases are freed of the remaining HCl-content in a column 6 and withdrawn as waste gas 53 having a corresponding water content.

Performing the process of the preferred embodiment according to FIG. 2 corresponds to performing the process according to FIG. 1 with regard to apparatus 1, 2, 5 and 6.

In the process according to FIG. 2, as opposed to FIG. 1, water is withdrawn in apparatus 3' in known manner from the main stream of hydrochloric gases by using a stream 42' of entrainers fed to apparatus 3'.

The water-loaded entrainer 41' is withdrawn from apparatus 3', freed from excess water in apparatus 4' and recycled to apparatus 3'.

In this process only one main stream 31' of superazeotropic hydrochloric acid comes about which is condensed as described for FIG. 1.

WORKING EXAMPLES

Example 1 (Pressure method)

In a pickling plant of a steel works 3 m³ of commercial 33% hydrochloric acid is employed hourly for a particular pickling program. This acid is now regenerated after use to a reusable 33% hydrochloric acid. As the acid cannot be spent entirely because a certain proportion of free hydrochloric acid has to be present at all times for the pickling process, the solution used for regeneration is composed as follows:

330 g/l metal chloride (mostly $FeCl_2$)
180 g/l free hydrochloric acid
820 g/l water This solution is fed to a regeneration plant, as described in FIG. 1, wherein the solution is evaporated and the metal chlorides are thermally decomposed into metal oxides and HCl-gas. The resulting roasting gas is composed as follows:

1110 kg HCl
3002 kg $H_2O$
2930 $Nm^3 N_2+O_2+CO_2$

From this roasting gas the hydrochloric acid is now not recovered, as is conventional in prior art processes, in an absorption column but only so much acid is condensed as that the water content of the condensed acid corresponds to that quantity of water which has to be removed from the system. In this partial condensation hydrochloric acid of approximately 22% results.

In the present case 752 kg $H_2O$ have to be withdrawn in order to obtain a 33% hydrochloric acid which corresponds to a volume to be condensed of 858 l of the approximately 20% hydrochloric acid.

This partial stream of 858 l of 20% hydrochloric acid is split into 98% HCl-gas and water vapor in accordance with the above described pressure method, applying different pressures, the water vapor (752 kg) being withdrawn with the waste gas of the roasting gas and the HCl-gas (188 kg) being reintroduced to the remaining roasting gas.

From the combined roasting gas stream wherein the HCl-$H_2O$-ratio necessary for the condensation is now present, 3360 kg of 33% hydrochloric acid results by cooling in a condensator with fitted bottom column for the purification of the remaining inert gases. In this manner only 752 kg water had to be evaporated off, whereby the energy expenditure could be considerably reduced in relation to a separate concentration plant for the preparation of 33% hydrochloric acid.

Example 2 (Process involving entrainers):

A metal chloride solution according to example 1 was regenerated as described in example 1, in which case a hydrochloric roasting gas having the same composition as in example 1, resulted.

In a packed column water is withdrawn from this roasting gas by adding a concentrated calcium chloride solution. The water diluted $CaCl_2$-solution (3193 l) is upgraded again to a concentrated $CaCl_2$-solution (2490 l, 48%) in a vacuum-evaporation plant, the excess water (752 kg) being removed as water vapor. The upgraded 48% $CaCl_2$ -solution goes back again into the column for dewatering the roasting gas.

The roasting gas coming from the dewatering process now has the desired composition and the required HCl-$H_2O$-ratio resulting, by cooling in a condensator with fitted bottom column, in 3360 kg of a 33% hydrochloric acid, as in example 1.

The energy consumption is somewhat more favorable in example 1 than in example 2 although the same volume of water has to be removed from the system. The reason for this is that the degree of efficiency of the apparatus for the separation of the HCl-water-mixture or for upgrading the diluted $CaCl_2$-solution, respectively, varies. Furthermore, separation from the remaining hydrogen chloride from the entrainer need not take place if the pressure method is applied.

What is claimed is:

1. A process for preparing superazeotropic aqueous hydrochloric acid from a metal chloride solution which comprises the following steps:

a) thermally decomposing the metal chloride solution to form an HCl-containing gas mixture;

b) branching a partial stream of the HCl-containing gas mixture from a main stream thereof;

c) separating the partial stream into HCl gas and water; and d) recombining the separated HCl gas with the main stream; and e) condensing the recombined main stream to obtain superazeotropic aqueous hydrochloric acid.

2. A process according to claim 1 wherein the metal chloride solution is a spent pickling solution.

3. A process according to claim 1 wherein step (a) is effected in a spray roasting reactor or in a fluidized bed reactor.

4. A process according to claim 1 which comprises condensing or absorbing in water the partial stream of HCl-containing gas mixture.

5. A process according to claim 1 which comprises dewatering the HCl-containing gas mixture or the partial stream of the HCl-containing gas mixture by applying different pressures.

6. A process according to claim 1 wherein the obtained superazeotropic hydrochloric acid comprises a hydrogen chloride content of more that 27% by weight.

7. In a method for processing ore or metal or for ore leaching with a hydrochloric solution, the improvement wherein at least a portion of the hydrochloric solution originates from superazeotropic hydrochloric acid prepared according to the process of claim 1.

* * * * *